United States Patent Office 3,655,638
Patented Apr. 11, 1972

3,655,638
AZO DYESTUFFS CONTAINING TRIAZINES AND VATTABLE POLYCYCLIC QUINONES
Paul Ulrich, Basel, and Christoph Frey, Oberwil, Basel-Land, Switzerland, assignors to Ciba Geigy AG, Basel, Switzerland
No Drawing. Filed Feb. 3, 1969, Ser. No. 796,169
Claims priority, application Switzerland, Feb. 8, 1968, 1,860/68; Dec. 13, 1968, 18,662/68
Int. Cl. C09b 62/08
U.S. Cl. 260—153
11 Claims

ABSTRACT OF THE DISCLOSURE

Dyestuffs wherein a six-membered heterocyclic ring containing three nitrogen atoms as ring members is bound to two vattable chromophores free from sulphonic acid groups to each through an —NH— bridge, and through an —O— or —NH— bridge to a non-metallizable azo dyestuff residue, are valuable vat dyestuffs with excellent properties of wet fastness and surprising properties in respect of application.

---

The present invention is based on the observation that valuable, non-metallizable dyestuffs may be obtained by condensing in any desired sequence, heterocyclic compounds consisting of a six-membered ring containing three nitrogen atoms as ring members and three reactive substituents each bound to a carbon atom of the ring with vattable polycyclic quinones free from $SO_3H$ groups and which contain acylatable amino groups and a non-metallizable azo dyestuff containing a hydroxyl or an acylatable amino group in a manner such that vat dyestuffs are formed that contain as azo dyestuff residue in addition to two vattable chromophores. For example, a triazine, especially a triazine of the formula

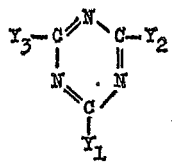

in which $Y_1$, $Y_2$ and $Y_3$ each represents an easily replaceable substituent (for example, a methanesulphonyl, benzenesulphonyl or $SO_3H$ group, an etherified mercapto group, an $R_1$—CS—S group [$R_1$=an amino or alkyl group], a sulphinic acid, ammonium or a hydrazinium grouping, or especially a halogen atom, for example, a chlorine atom or a bromine atom), may be condensed in any desired sequence in a molecular ratio of 1:1:2 with a non-metallizable azo dyestuff containing an acylatable grouping, especially an acylatable amino or hydroxyl group, that is to say, a dyestuff free from salt-forming groups capable of forming a metal complex on either side of and vicinal to the azo bridge, and vattable polycyclic quinones containing acylatable amino groups and which are free from $SO_3H$ groups.

Heterocyclic, reactive compounds containing three nitrogen atoms in the ring that are suitable for use in the process of this invention are primarily 1,3,5-triazine compounds, especially those of Formula I. Examples of such triazine compounds are 2,4,6-trichloro-1,3,5-triazine or 2,4,6-tribromo-1,3,5-triazine.

In accordance with the invention, vattable, polycyclic quinones containing acylatable groupings and which are free from $SO_3H$ groups are condensed with these heterocycles in a molar ratio of 1:2.

The term "vattable quinone" as used herein refers to a chromophore that can be converted by reduction into a so-called leuco form or vatted form, which has better affinity for natural or regenerated cellulose fibres than the unreduced form, and that can then be converted back into the original chromophore system by oxidation. Thus, polycyclic quinones of the 1-amino-4-arylaminoanthraquinone-2-sulphonic acid type are not suitable for use in the process of the present invention because, although they can be reduced, they are chemically modified to such an extent by the reduction process that they cannot be converted back into the original chromophore system. The following are given as examples of vattable, polycyclic quinones that may contain an acylatable amino group; perylenetetracarboxylic acid imides, especially phenylimides, anthrapyridimines, anthrapyridones, isothiazole-anthrones, quinazoline-anthraquinones, oxazole-anthraquinones, thiazole-anthraquinones, oxidazole-anthraquinones, anthraquinonyltriazoles, pyrazole-anthraquinones, dipyrazole-anthronyls, pyrazino-anthraquinones, azabenzanthrones, indanthrones, thioxanthone-anthraquinones, anthrimides, anthrimide-carbazoles, dihydro-acridines, anthanthrones, pyranthrones, dibenzpyrene-quinones, dibenzanthrones, isodibenzanthrones, flavanthrones, acedianthrones and especially anthraquinone-acridones and the anthraquinones themselves, the latter including not only derivatives containing true 9,10-dioxoanthracene rings, but also those containing thiophanthrone residues and the like, as well as anthraquinone compounds containing the 9,10-dioxoanthracene rings that may contain the usual substituents, for example, halogen atoms or alkoxy, alkyl, sulphonic acid amide, sulphone and acylamino groups, and, if desired or required, further carbocyclic and heterocyclic rings fused on and incorporated by condensation. The following are given as examples: 4-aminoanthraquinone-2,1(N)-acridones, 4,4'-, 4,5'- or 5,5'-diamino-1,1'-dianthrimidecarbazole, amino-pyranthrones, monoamino- and diamino - acedianthrone, aminoisodibenzanthrone, aminodibenzanthrone, aminoanthanthrone, aminoflavanthrone, aminopyranthrone, 4-, 5- or 8-amino-1,1'-dianthrimidecarbazole, 4- or 5-amino-5'-benzoylaminodianthrimidecarbazole, 4-amino-4'-benzoylaminodianthrimidecarbazole, aminodibenzpyrenequinone, and also monoamino- and diamino-trianthrimidecarbazoles, for example, 8',8''-diamino-1',1,4,1'''-trianthrimidecarbazole, as well as perylenetetracarboxylic acid di-(para- or meta-aminophenyl)-amide, the compounds of the formulae

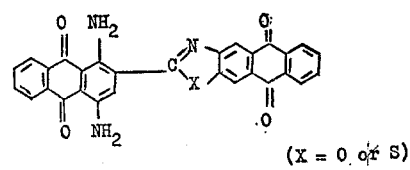

(X = O or S)

and

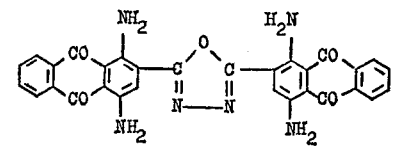

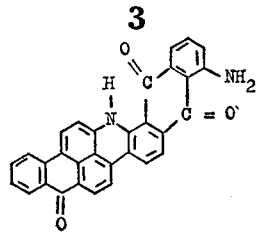

and preferably those of the formula

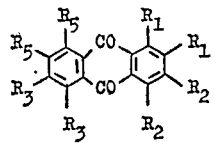

in which one of the symbols $R_1$ represents a hydrogen atom and the other represents a grouping of the formula

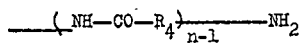

$n=1$ or 2, one of the symbols $R_2$, $R_3$ and $R_5$ represents a halogen atom or an alkoxy, aryloxy, arylmercapto or acylamino group, especially a benzoylamino group, for example, a chloro, methyl-, sulpho- or fluoro-benzoylamino group, or the unsubstituted $C_6H_5$—CO group itself, the other of the symbols $R_2$, $R_3$ and $R_5$ each represents a hydrogen or a halogen atom, and in which one of the pairs of symbols $R_2R_2$, $R_3R_3$ or $R_5R_5$ together may represent a grouping of the formula

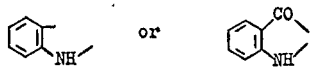

and $R_4$ represents an arylene residue, preferably one of the benzene series.

Non-metallizable hydroxy- or amino-azo dyestuffs, that is to say, azo dyestuffs free from salt-forming groups capable of metal-complex formation on either side of and vicinal to the azo bridge, suitable for use in the process of the present invention are monoazo dyestuffs containing sulphonic acid groups and also, preferably, monoazo dyestuffs free from sulphonic acid groups. The said monoazo dyestuffs may belong to a very wide variety of classes; for example, the azo dyestuffs used as starting materials may be aminobenzeneazopyrazolones, aminobenzene-azonaphthols, or 4-benzene-azo-1-aminophenyl-3-methyl- or -3-carboxy-5-pyrazolones. Specially valuable results may be obtained, however, with the aminoazo dyestuffs of the formula

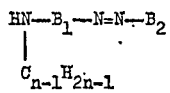

and the hydroxyazo dyestuffs of the formula

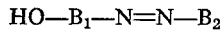

in which $n$ stands for an integer not greater than 5 and $B_1$ and $B_2$ each represents an aryl residue that is not more than tricyclic, especially a benzene or naphthalene residue free from sulphonic acid and carboxyl groups which contains a non-salt-forming substituent, especially a low-molecular alkyl group, a halogen atom or a phenoxy group, in a position vicinal to the azo bridge and/or the —NH or —OH group. Azo dyestuffs of this kind may easily be obtained by known processes by coupling, for example, phenols or naphthols, aniline, N-methylaniline, ortho- or meta-toluidine, ortho- or meta-anisidine, cresidine or a naphthylamine with diazo compounds derived from 2-amino-benzthiazole, dehydrothiotoluidine, aniline, α- and β-naphthylamine, ortho- and meta-toluidine, cresidine, nitro-anilines, ortho-, meta- or para-chloroaniline, dichloroanilines, the sulphonic acids thereof and the like, or by saponifying the monoazo dyestuffs derived from acylaminoanilines and pyrazolones or naphthols or 2-hydroxynaphthoic acid amides.

Synthesis of the dyestuffs of the invention may be effected by reacting the heterocycles indicated above, for example, 2,4,6-trichloro-1,3,5-triazine, with the amino or hydroxy compounds.

Since the dyestuffs of the invention contain two vattable residues, they may be identical or different from each other. It is thus possible, inter alia, to produce valuable blends of shades by a combination of two different vattable compounds. For example, a combination of aminoanthraquinone and aminophthaloylacridone produces green to olive-green colorants. When the vattable compound contains at least two amino groups, and is reacted with a heterocyclic compound which contains at least two substituents capable of condensation it is possible to produce dimeric or possibly polymeric colorants.

The components can generally be reacted in any desired sequence. For example, the aminoazo or hydroxyazo compounds may first be reacted with the reactive heterocyclic compound and the product subsequently reacted with the vattable compounds. The heterocycle may also be first reacted with the vattable compounds and the reaction product condensed with the aminoazo or hydroxyazo compounds. Condensation with the vattable quinones is preferably carried out with the application of heat.

Depending on the components used and the sequence to be adopted, the media used for the reaction may be aqueous systems (for example, water/acetone) or organic solvents, for example, nitrobenzene, a dichlorobenzene, a trichlorobenzene, dimethylaniline, N-methylpyrrolidone, pyridine and so forth, or also phenol. In some cases it may be advantageous to add to the reaction a compound which facilitates the removal of HCl which is formed, for example, a tertiary base (pyridine, and so forth) or dimethylformamide. In some cases it may also be advantageous to pass a gentle stream of air or nitrogen through the reaction mixture during the reaction.

The dyestuffs of the invention may also be obtained by a modification of the present process which consists in replacing the chromophoric compounds containing amino groups used as starting materials with the corresponding halogeno compounds (for example, chloroanthraquinone instead of aminoanthraquinone) and condensing them with heterocycles containing a six-membered ring having three nitrogen atoms as ring members and containing three reactive amino groups bound respectively to the three carbon atoms of the ring. Heterocycles of the kind defined are principally triaminotriazines. For example, an azo dyestuff of the formula

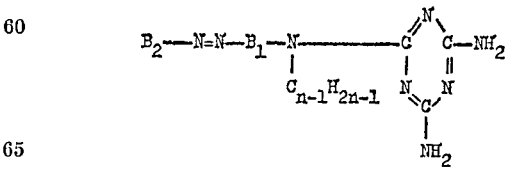

may be condensed with halogenoanthraquinones to form the vat dyestuffs of the invention.

The dyestuffs of the invention may also be synthesized by coupling in those cases where the heterocyclic compound has been condensed with vattable amino compounds and with an amine or a hydroxyaryl compound which, in addition to the position at which condensation can take place, also has a position at which coupling or diazotization can take place.

The dyestuffs obtainable by the present process are new. They are suitable for colouring a very wide variety of materials, but especially for dyeing or printing textile materials made from natural or regenerated cellulose by the conventional vat-dyeing or printing processes. The dyeings and prints obtained thereby are distinguished by good to very good fastness to light and excellent properties of wet fastness.

It is surprising that the new dyestuffs can be applied as vat dyestuffs in spite of the presence of the reducible azo group. Special mention should be made of the fact that the present process yields, inter alia, dyestuffs that are independent of temperature in respect of application. Furthermore, the shade can be influenced by means of the azo portion.

Application of the dyestuffs may be effected by a wide variety of processes, for example, by the exhaustion process, and also by the known semi-continuous and continuous pad-dyeing processes, for example, the pad-jig, pad-steam, cold pad-batch processes, and so forth.

In some cases the dyestuffs may also be used for dyeing synthetic fibres made from so-called polyamides, or also for dyeing polyester fibres, especially according to the Thermosol process.

Dyestuffs of the invention that contain at least two anthraquinone residues yield dyeings that are also fast to dry-cleaning and migration. Thus, fabrics dyed therewith can be coated with synthetic resins, for example, polyvinyl chloride, without the dyestuff migrating into the synthetic resin, which is specially important in the manufacture of artificial leather.

Some of the products of the invention may also be used as pigments for colouring a wide variety of lacquers and also for colouring synthetic resins.

with 4-aminoazobenzene in molar ratio of 1:1 in aqueous acetone or in nitrobenzene), 4.5 parts of 1-aminoanthraquinone and 0.3 part of pyridine are heated to 120° C. in 60 parts of nitrobenzene. The reaction mixture is kept at that temperature for 4 hours, heated for a further 4 hours at 170° C. and then for 2 hours at 210° C. The batch is allowed to cool to about 80° C., filtered and the filter residue is washed successively with nitrobenzene and ethanol and then dried in vacuo. The dyestuff so obtained of the formula

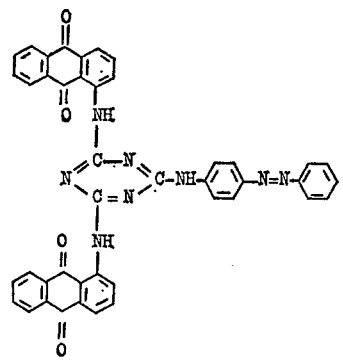

dyes cotton a reddish yellow shade from a reddish orange vat.

EXAMPLE 2

3.8 parts of the mono-condensation product derived from cyanuric chloride and 4-amino-4'-chloroazobenzene are condensed with 6.8 parts of 1-amino-5-benzoylaminoanthraquinone in the presence of 0.3 part of pyridine in 60 parts of nitrobenzene in accordance with Example 1 and the product is worked up as described therein. The dyestuff so obtained of the formula

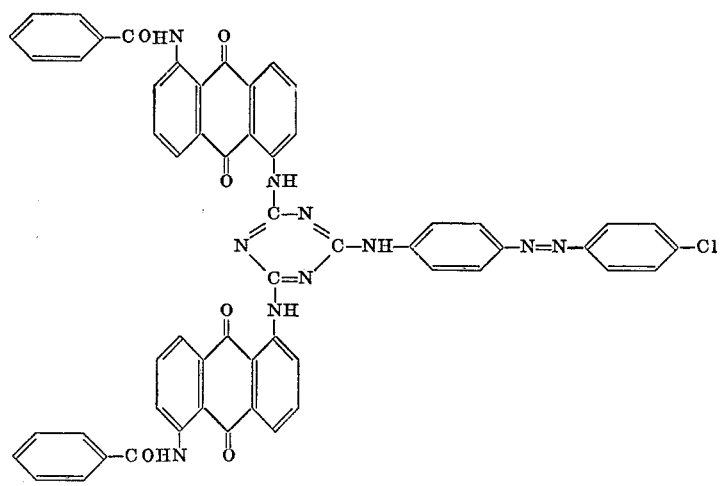

The following examples illustrate the invention. Unless otherwise stated, the parts and percentages are by weight, the relationship between parts by weight and parts by volume being the same as that between the gram and the millilitre.

EXAMPLE 1

3.5 parts of 2,4-dichloro-6-(4'-phenylazophenylamino)-1,3,5-triazine, (obtained by reacting cyanuric chloride dyes cotton a brilliant orange shade from a claret vat.

Further dyestuffs may be obtained in the manner described in Example 1 with the dichlorotriazinyl compound of the azo dyestuffs listed in the second column of the following table and the aminoanthraquinones listed in the third column. The shades they produce are indicated in the fourth column.

TABLE I

| Example | Dichlorotriazinyl compound of the azo dyestuff | Aminoanthraquinone component | Shade on cotton |
|---|---|---|---|
| 3 | C₆H₅–N=N–C₆H₄–NH₂ | 1-amino-3-chloroanthraquinone | Greenish yellow. |
| 4 | Cl–C₆H₄–N=N–C₆H₄–NH₂ | 1-amino-5-benzamidoanthraquinone | Orange. |
| 5 | (2-Cl)C₆H₄–N=N–C₆H₄–NH₂ | Same as above | Do. |
| 6 | Same as above | 1-amino-5-(2-chlorobenzamido)anthraquinone | Do. |
| 7 | (2-CH₃)C₆H₄–N=N–C₆H₄–NH₂ | 1-amino-5-benzamidoanthraquinone | Do. |
| 8 | (2-CH₃)C₆H₄–N=N–(2-CH₃)C₆H₃–NH₂ | Same as above | Do. |
| 9 | Cl–C₆H₄–N=N–C₆H₄–NH₂ | 1 mol 1-aminoanthraquinone and 1 mol 1-amino-4-(2-benzamido)anthraquinone | Green. |

EXAMPLE 10

6.2 parts of the product obtained by reacting 1 mol of cyanuric chloride with 2 mols of 1-amino-4-methoxy-anthraquinone are heated together with 3.6 parts of the azo dyestuff of the formula

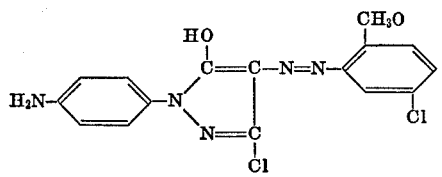

in 100 parts of nitrobenzene to 125 to 130° C. in the presence of 0.3 part of pyridine. The reaction mixture is stirred for 20 hours at that temperature, a gentle stream of nitrogen or air being conducted through the reaction vessel throughout the reaction.

After the reaction the batch is allowed to cool to about 100° C., filtered while hot, and the filter residue is washed successively with nitrobenzene and methanol and dried in vacuo.

When used as a pigment, the product thus isolated, of the formula

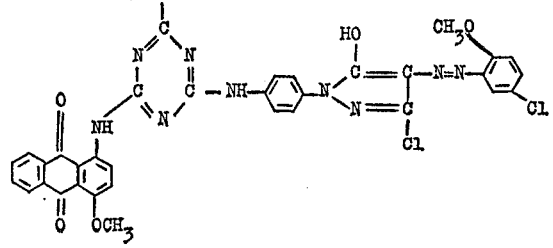

colours polyvinyl chloride a scarlet shade possessing excellent fastness to migration.

TABLE II

| Example | Dianthraquinonemonochlorotriazine component | Aminoazo component | Shade on cotton |
|---|---|---|---|
| 11 | ![structure] | H₂N—⌬—N=N—⌬—NHCO—⌬ | Yellow. |
| 12 | ![structure] | H₂N—(naphthyl)—N=N—⌬(CH₃) | Red. |
| 13 | Same as above | H₂N—⌬—N=N—C(—C—CH₃)=... pyrazolone with phenyl | Red. |

*Analysis.*—Calculated (percent): C, 63.93; H, 3.76; N, 14.91. Found (percent): C, 63.87; H, 3.91; N, 14.73.

Further colorants may be obtained in the manner described in Example 10 using the components listed in Table II.

EXAMPLE 14

5.6 parts of the product obtained by reacting 1 mol of cyanuric chloride with 2 mols of 1-aminoanthraquinone are heated to 205 to 210° C. in 60 parts of nitrobenzene together with 2.0 parts of 4-hydroxyazobenzene and 0.3 part of pyridine. The batch is stirred for 3 hours at that temperature while a gentle stream of nitrogen or air is conducted through the reaction mixture throughout the reaction. The batch is allowed to cool to 50 to 60° C., filtered, the filter residue is washed successively with nitrobenzene and methanol and then dried in vacuo. The dyestuff of the formula

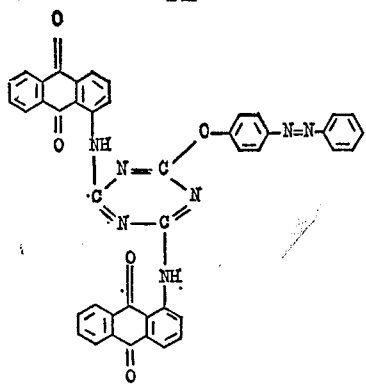

is obtained in the form of a yellow powder. It dyes cotton and viscose rayon a clear yellow shade when applied according to the usual vat-dyeing process.

*Analysis.*—Calculated (percent): C, 71.76; H, 3.50; N, 13.62. Found (percent): C, 71.4; H, 3.7; N, 13.6.

Further dyestuffs may be obtained by the process described in Example 14 from the components listed in the second and third columns of Table III below.

TABLE III

| Example | Dianthraquinonemonochlorotriazine component | Hydroxyazo component | Shade |
|---|---|---|---|
| 15 | ![structure] | HO—⬡—N=N—⬡(Cl) | Yellow. |
| 16 | Same as above | HO—⬡—N=N—⬡(CH₃)(Cl) | Do. |
| 17 | do | HO—⬡(Cl)—N=N—⬡(Cl) | Do. |
| 18 | do | HO—⬡(Cl)—N=N—⬡(Cl) | Do. |
| 19 | do | HO—⬡(CH₃)—N=N—⬡(CH₃)(Cl) | Do. |
| 20 | do | HO—⬡(CH₃)—N=N—⬡(CH₃)(Cl) | Do. |
| 21 | do | HO—(naphthyl)—N=N—⬡ | Do. |

TABLE III—Continued

| Example | Dianthraquinonemonochlorotriazine component | Hydroxyazo component | Shade |
|---|---|---|---|
| 22 | (structure: tetrahydroanthraquinone-NH-chlorotriazine-NH-anthraquinone) | HO—C₆H₄—N=N—naphthyl | Yellow. |
| 23 | Same as above | HO—C₆H₄—N=N—C₆H₃(Cl)(O-C₆H₅) | Do. |
| 24 | do | HO—C₆H₄—N=N—C₆H₄—N=N—C₆H₅ | Do. |
| 25 | (structure: 3-chloroanthraquinone-NH-chlorotriazine-NH-3-chloroanthraquinone) | HO—C₆H₄—N=N—C₆H₄(o-CH₃) | Greenish yellow. |
| 26 | Same as above | HO—C₆H₄—N=N—C₆H₃(CH₃)(Cl) | Do. |
| 27 | do | HO—C₆H₄—N=N—C₆H₃(Cl)(O-C₆H₅) | Do. |
| 28 | do | HO—C₆H₃(Cl)—N=N—C₆H₄(Cl) | Do. |
| 29 | do | HO—C₆H₃(Cl)—N=N—C₆H₄(Cl) | Do. |
| 30 | do | HO—C₆H₃(CH₃)—N=N—C₆H₃(CH₃)(Cl) | Do. |

TABLE III—Continued

| Example | Dianthraquinonemonochlorotriazine component | Hydroxyazo component | Shade |
|---|---|---|---|
| 31 | Same as in Example 25 | (HO–C₆H₃(CH₃)–N=N–C₆H₃(CH₃)–Cl) | Greenish yellow |
| 32 | do | (HO–C₆H₄–N=N–naphthyl) | Do. |
| 33 | (1,5-dimethoxy anthraquinone linked via NH to chlorotriazine linked via NH to 1-methoxy-4-amino anthraquinone) | (HO–C₆H₄–N=N–C₆H₂(OCH₃)(CH₃)–N=N–C₆H₄–OCH₂CH₂OH) | Scarlet |
| 34 | (5-benzamido anthraquinone linked via NH to chlorotriazine linked via NH to 5-benzamido anthraquinone) | (HO–C₆H₄–N=N–C₆H₃(Cl)₂) | Golden orange |
| 35 | Same as above | (HO–C₆H₃(CH₃)–N=N–C₆H₃(CH₃)–Cl) | Do. |
| 36 | do | (HO–C₆H₄–N=N–naphthyl) | Do. |
| 37 | do | (HO–C₆H₄–N=N–C₆H₃(Cl)(OC₆H₅)) | Do. |
| 38 | do | (HO–naphthyl–N=N–naphthyl) | Do. |

TABLE III—Continued

| Example | Dianthraquinonemonochlorotriazine component | Hydroxyazo component | Shade |
|---|---|---|---|
| 39 | [structure: dianthraquinone with benzamide groups linked via monochlorotriazine] | HO—C₆H₄—N=N—C₆H₄—N=N—C₆H₅ | Golden orange. |
| 40 | [structure: dianthraquinone with NHCO-phenyl groups linked via monochlorotriazine] | HO—C₆H₄—N=N—C₆H₅ | Red. |
| 41 | Same as above | HO—C₆H₄—N=N—C₆H₄(o-CH₃) | Red. |
| 42 | do | HO—C₆H₄—N=N—C₆H₃(Cl)(O-C₆H₅) | Red. |
| 43 | do | HO—C₆H₃(CH₃)—N=N—C₆H₄—N(CH₂CH₂OH)₂—... —C₆H₃(CH₃)—N= | Claret. |
| 44 | do | HO—C₆H₃(CH₃)—N=N—C₆H₄—N(CH₂CH₂OH)₂—... —C₆H₃(CH₃)—N= | Do. |

3,655,638

TABLE III—Continued

| Example | Dianthraquinonemonochlorotriazine component | Hydroxyazo component | Shade |
|---|---|---|---|
| 45 | Same as in Example 40 | 1-(2-chlorophenylazo)-2,3-dihydroxynaphthalene | Brown. |
| 46 | 1,1'-bis(4-phenylthioanthraquinonylamino) monochlorotriazine | 1-(4-hydroxyphenylazo)anthraquinone | Red. |
| 47 | bis(phenylamino-anthraquinonyl) monochlorotriazine derivative | 4-hydroxy-2'-methyl-4'-chloroazobenzene | Blue. |
| 48 | Same as above | 4-hydroxy-(4'-chloro-2'-phenoxyphenylazo)benzene | Do. |
| 49 | do | 1-(4-hydroxyphenylazo)anthraquinone | Do. |

TABLE III—Continued

| Example | Dianthraquinonemonochlorotriazine component | Hydroxyazo component | Shade |
|---|---|---|---|
| 50 | 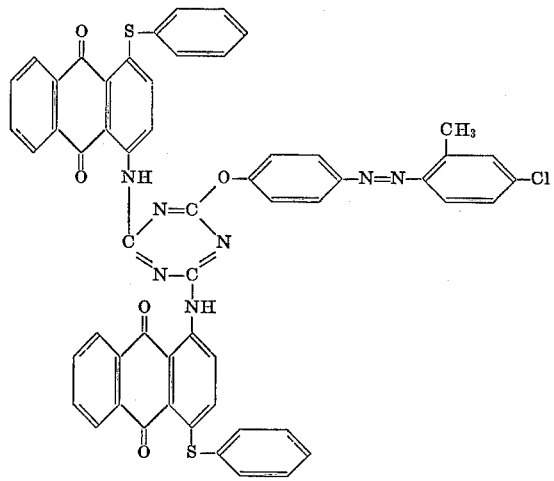 | | Yellow. |

EXAMPLE 51

7.8 parts of the product obtained by reacting 1 mol of cyanuric chloride with 2 mols of 1-amino-4-phenylmercaptoanthraquinone, 2.6 parts of 4-hydroxy-2'-methyl-4'-chloroazobenzene and 0.1 part of pyridine are heated to the boil in 80 parts of nitrobenzene while stirring. The batch is kept at that temperature for 2 hours while passing through it a stream of nitrogen or air from time to time to remove the hydrochloric acid that is formed.

The batch is allowed to cool to room temperature, filtered, and the filter residue is washed successively with nitrobenzene and methanol and dried in vacuo.

4.0 parts of the dyestuff so obtained of the formula are introduced in small portions while stirring vigorously into 50 parts of 100% sulphuric acid. When all four parts have been added, the reaction mixture is stirred for a further 5 hours and the reaction product is then discharged into a 5% ice/sodium chloride solution. The batch is filtered, the filter residue is washed successively with a 5% sodium chloride solution and a small amount of ice-water until the washings run neutral and then dried in vacuo.

A dyestuff containing one sulphonic acid group per mol is obtained in the form of a red powder. The dyestuff so obtained displays much better affinity than the unsulphonated starting product and dyes cotton a yellowish red shade.

Dyeing procedure

The dyeing of 10 parts of a knitted polyester fabric ("Crimplene" texturized polyester fabric) is started at 30° C. in a pressurized dyeing apparatus in a dyebath containing 0.8 part of the adduct of 9 mols of ethylene oxide and 1 mol of nonylphenol and 2 parts of a 5% dispersion of the dyestuff described in Example 13 in 400 parts of water. The liquor has a pH value of 7.0. The temperature is raised to 120° C. within 15 minutes, a pressure of about 2 atmospheres (gauge) being developed. Dyeing is carried out for 45 minutes at 120° C. and the dyebath cooled to 65° C. within 10 minutes. The textile material is then rinsed cold and dried. A red dyeing possessing excellent fastness to light is obtained.

Dyeing procedure 1 part of dyestuff is vatted at 50 to 70° C. in 200 parts of water with 10 parts by volume of sodium hydroxide solution (36 Bé.) and 5 parts of sodium hydrosulphite. The stock vat thus prepared is added to a dyebath containing 5 parts by volume of sodium hydroxide solution (36 Bé.) and 3.7 parts of sodium hydrosulphite in 2,000 parts of water, and then 100 parts of cotton are entered at 40° C. After 10 minutes, 15 parts of sodium chloride are adedd, followed 20 minutes later by a further 15 parts, and dyeing is carried out for 45 minutes at 40° C. The cotton is then squeezed, oxidized, and further treated in the usual manner.

Pigmenting procedure 5 parts of pigment (for example, as obtained in Examples 1, 10, 15, 16, 34 or 38) are mixed with 95 parts of dioctyl phthalate and the mixture is ground in a ball mill until the pigment particles are smaller than 3μ.

0.8 part of the dioctyl phthalate paste so obtained is mixed with 13 parts of polyvinyl chloride, 7 parts of dioctyl phthalate, 0.1 part of cadmium stearate and 1 part of titanium dioxide, and the mixture is worked to and fro for 5 minutes on a two-roller mill at 140° C.

Procedure for colouring a lacquer 40 parts of a nitrocellulos lacquer, 2.375 parts of titanium dioxide and 0.125 part of pigment (for example, as obtained in Examples 1, 15, 16, 34 or 38) are ground for 16 hours in a rod mill. A thin coat of the lacquer so obtained is applied to aluminium foil.

What is claimed is:
1. A compound of the formula

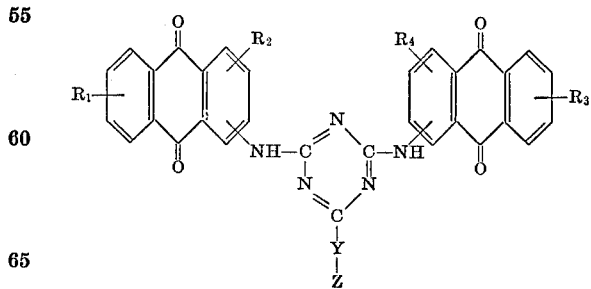

in which $R_1$ and $R_2$ each is independently hydrogen, benzoylamino, or chlorobenzoylamino, $R_2$ and $R_4$ each is independently hydrogen, chlorine, acetyl, benzoylamino, or phenylmercapto, or where both of the anthraquinonyl residues are replaced by unsubstituted phthaloyl acridone Y is —O— or —NH— and Z is a residue of the formula

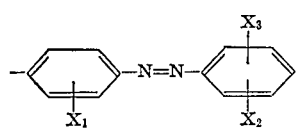

or

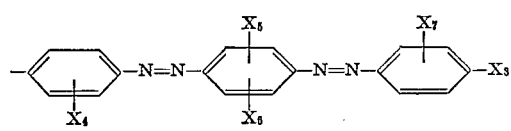

where

X₁ is hydrogen, chlorine, methyl, or a group fused to the phenyl forms naphthyl,
X₂ is hydrogen, chlorine, methyl, benzoylamino, phthaloyl or a group fused to the phenyl forms naphthyl,
X₃ is hydrogen, chlorine or phenoxy,
X₄ is hydrogen or methyl,
X₅ is hydrogen or methoxy,
X₆ is hydrogen or methyl,
X₇ is hydrogen or methyl, and
X₈ is hydrogen, hydroxyethyl, hydroxyethoxy or di-(hydroxyethyl)amino, the azo residues comprising group Z additionally being characterized in that said residues are free of salt-forming groups capable of forming metal complexes at the positions vicinal to the azo groups and are free of sulphonic acid and carboxyl groups.

2. The dyestuff as claimed in claim 1 of the formula

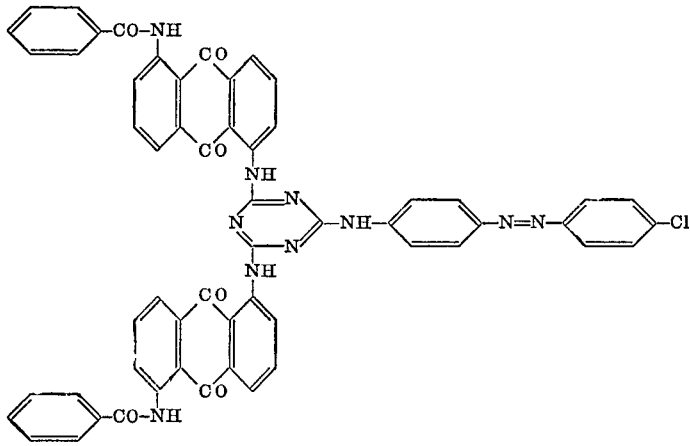

3. The dyestuff as claimed in claim 1 of the formula

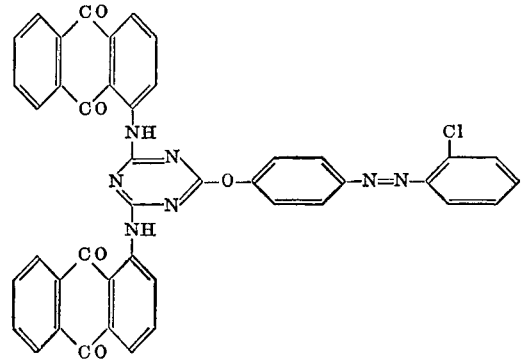

4. The dyestuff as claimed in claim 1 of the formula

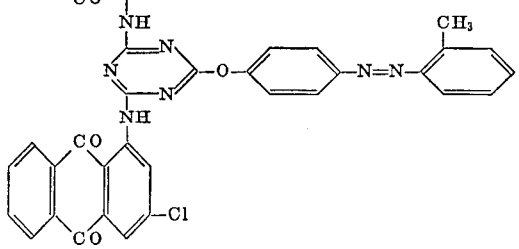

5. The dyestuff as claimed in claim 1 of the formula

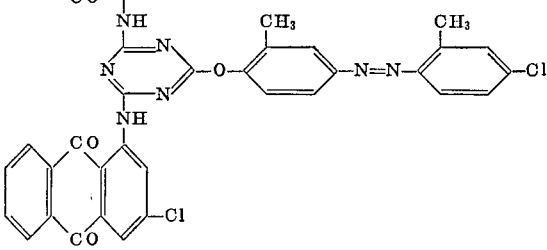

6. The dyestuff as claimed in claim 1 of the formula

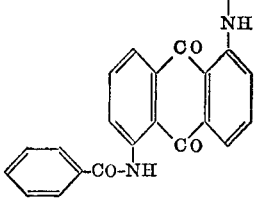

7. The dyestuff as claimed in claim 1 of the formula
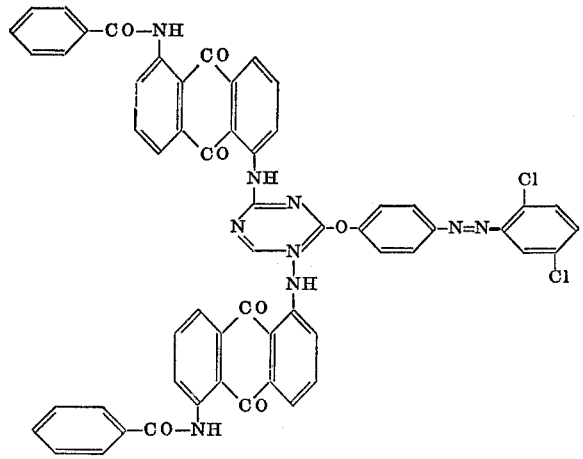
8. The dyestuff as claimed in claim 1 of the formula
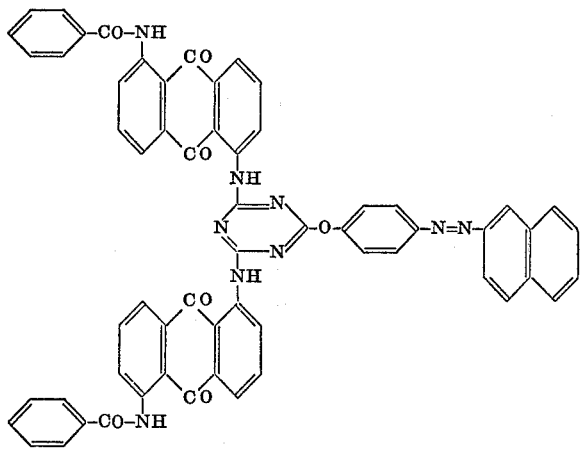
9. The dyestuff as claimed in claim 1 of the formula
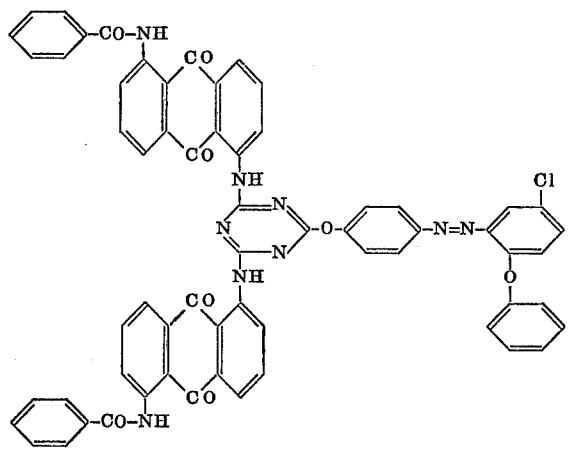
10. The dyestuff as claimed in claim 1 of the formula
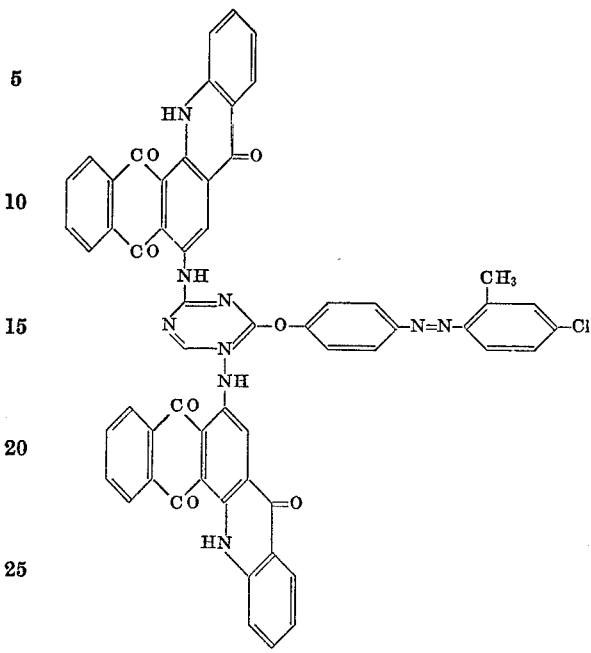
11. The dyestuff as claimed in claim 1 of the formula
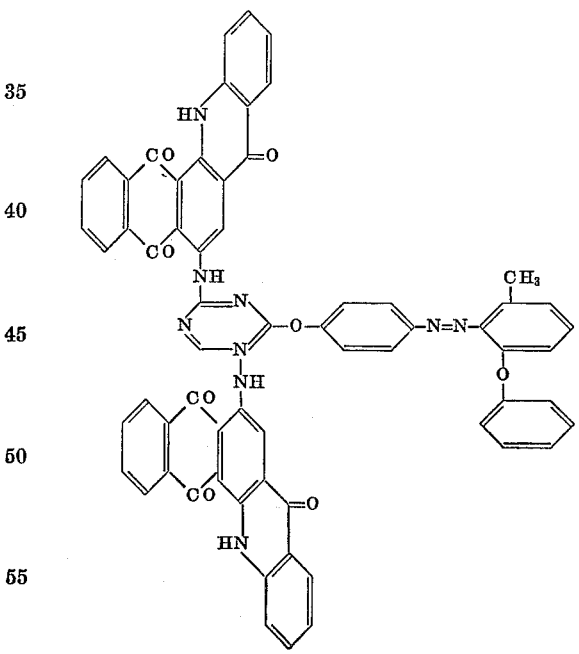
References Cited
UNITED STATES PATENTS
3,509,143   4/1970   Joyce et al. _____ 260—153
JOSEPH REBOLD, Primary Examiner
D. M. PAPUGA, Assistant Examiner
U.S. Cl. X.R.
260—41 C, 163, 186, 192, 194, 196, 197, 205, 206, 207.1, 249, 274, 276, 303, 307.5; 8—34, 179; 106—193 P

CASE 6379/E

PO-1050
(5/69)

UNITED STATES PATENT OFFICE
CERTIFICATE OF CORRECTION

Patent No. 3,655,638    Dated April 11, 1972

Inventor(s) PAUL ULRICH ET AL

It is certified that error appears in the above-identified patent and that said Letters Patent are hereby corrected as shown below:

Column 25, claim 7, the lower middle portion of the structural formula should be amended to read:

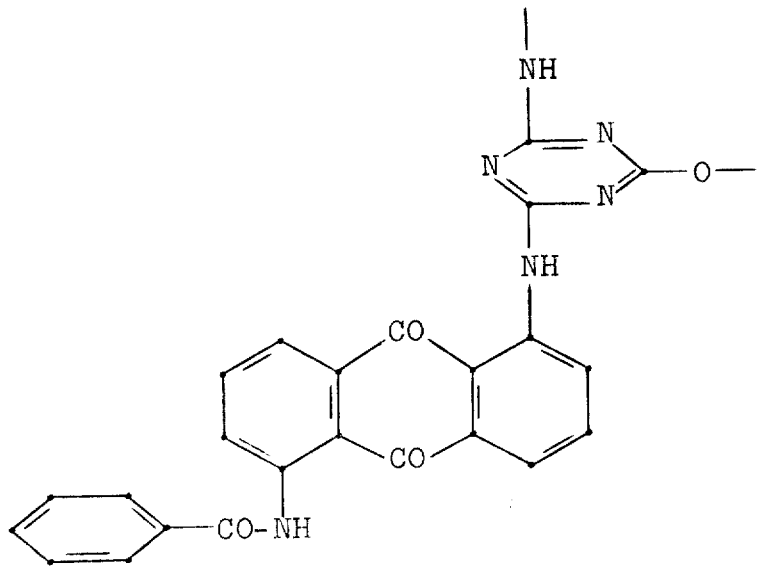

Column 25, claim 9, the middle portion of the structural formula should be amended to read:

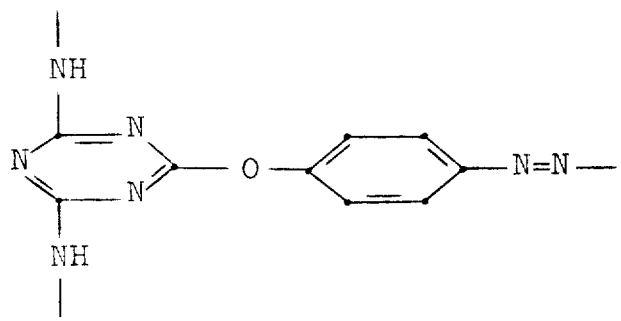

Page 1 of 3

CASE 6379/E

UNITED STATES PATENT OFFICE
CERTIFICATE OF CORRECTION

Patent No. 3,655,638                    Dated   April 11, 1972

Inventor(s)   PAUL ULRICH ET AL

It is certified that error appears in the above-identified patent and that said Letters Patent are hereby corrected as shown below:

Column 26, claim 10, the lower middle portion of the structural formula should be amended to read:

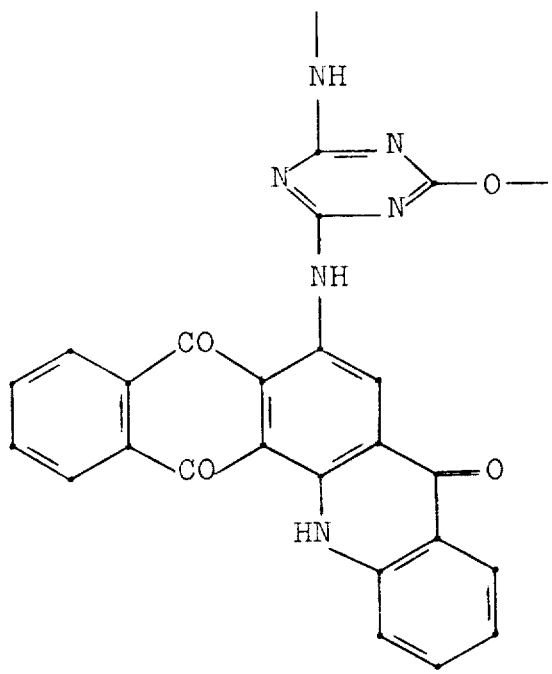

Page 2 of 3

UNITED STATES PATENT OFFICE
CERTIFICATE OF CORRECTION

Patent No. 3,655,638   Dated April 11, 1972

Inventor(s) PAUL ULRICH ET AL

It is certified that error appears in the above-identified patent and that said Letters Patent are hereby corrected as shown below:

Column 26, claim 11, the lower portion of the structural formula should be amended to read:

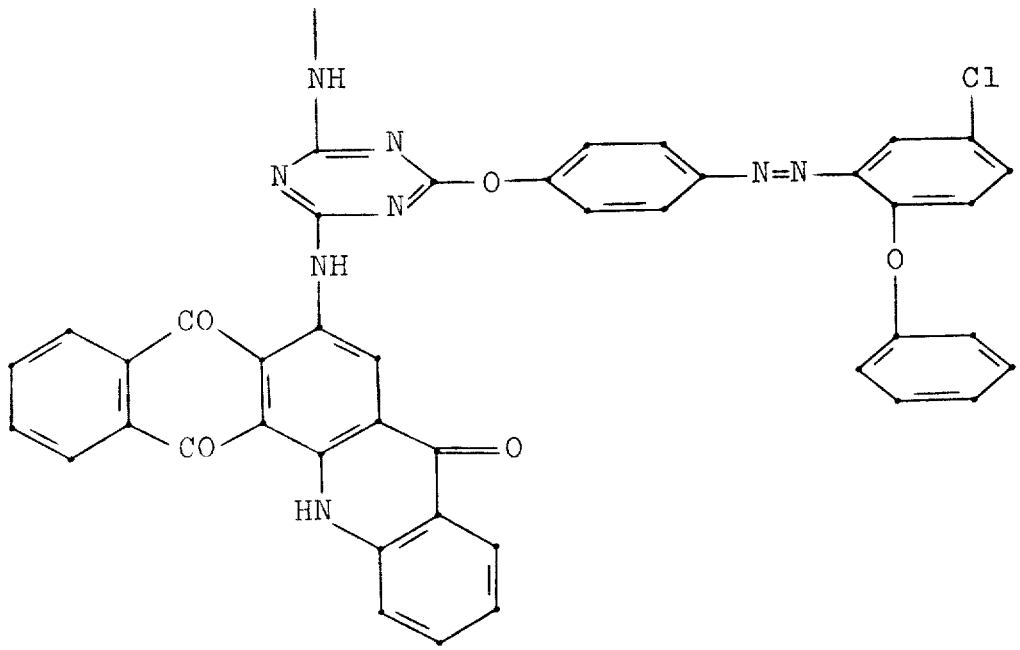

Signed and sealed this 30th day of January 1973.

(SEAL)
Attest:

EDWARD M. FLETCHER, JR.
Attesting Officer

ROBERT GOTTSCHALK
Commissioner of Patents